J. H. BROWN.
FRAMELESS EYEGLASS AND SPECTACLE MOUNTING.
APPLICATION FILED MAR. 2, 1911.
1,114,577.
Patented Oct. 20, 1914.
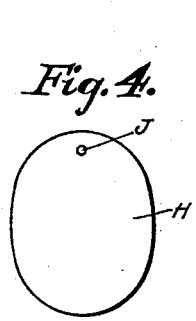
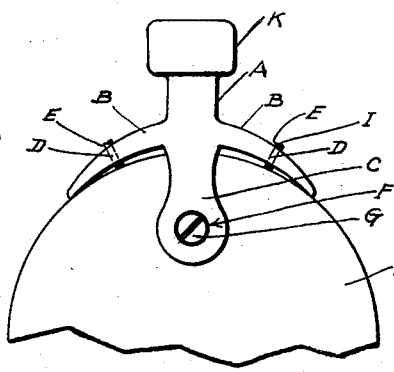
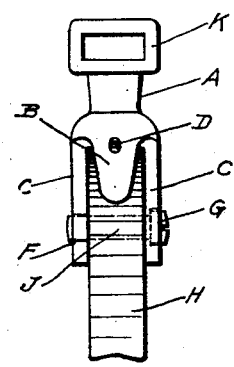
Fig. 4.   Fig. 1.   Fig. 2.
Fig. 3.
Fig. 5.
WITNESSES:
Irving C. Adams.
Frank D. Tibbetts
INVENTOR
James Hoyt Brown

UNITED STATES PATENT OFFICE.

JAMES HOYT BROWN, OF DENVER, COLORADO.

FRAMELESS EYEGLASS AND SPECTACLE MOUNTING.

1,114,577.　　Specification of Letters Patent.　　Patented Oct. 20, 1914.

Application filed March 2, 1911. Serial No. 611,945.

*To all whom it may concern:*

Be it known that I, JAMES HOYT BROWN, a citizen of the United States, residing at Denver, in the county of Denver and State of Colorado, have invented certain new and useful Improvements in Frameless Eyeglass and Spectacle Mountings; and I do declare the following to be a full, clear, and exact description of the invention, such as will enable others skilled in the art to which it appertains to make and use the same.

This invention relates generally to frameless eye glass and spectacle mountings, and particularly to means for preventing the lenses from working loose when attached to said mountings.

The invention has for its object to provide a simple, durable and inexpensive device or means that will permit lenses to be easily and quickly attached and rigidly adjusted to the said mountings, and it consists of the parts and combination of parts hereinafter described and claimed.

In the accompanying drawings forming a part of these specifications, Figure 1 is a side view of a frameless eye glass stud with a lens attached and showing my invention in combination with said stud and lens. Fig. 2 is a vertical edge view of a frameless eye glass stud with a lens attached and showing part of my invention. Fig. 3 represents a headless reversible screw. Fig. 4 represents a lens. Fig. 5 represents a pair of frameless spectacles without temples, with my invention applied.

Similar letters refer to similar parts throughout all the views.

In the drawings, "A" represents an eye glass stud with lens "H" attached.

"B B" are the lens straps which hold the screws "E E," which are intended to bear against the edge of the lens, as shown in Fig. 1.

"C C" are the ears of the said stud, and between said ears, the lens "H" is held, as shown in Fig. 2.

"D" represents a threaded hole through each strap "B B," as shown in one strap in Fig. 2.

"E" represents a headless reversible screw with a slot "1" at each of its ends to permit the use of a screw driver.

"F" represents the holes through the ears "C C."

"H" represents a lens.

"J" represents a hole through the lens.

"G" represents a lens screw which passes through one ear "C," and the hole "J" in the lens "H," and is then turned or screwed into the opposite ear "C" which is threaded to receive the said screw.

"K" represents the head of the stud "A" which holds the eye glass spring and nose guard (not illustrated nor shown in Figs. 1 and 2).

When attaching lens "H" to the stud "A," the screws "E E" in the straps "B B" are flush with the underside of said straps. The lens "H" is then put into position with ease. The lens screw "G" is then inserted through the hole "F" in the ear "C" and hole "J" in the lens "H," and turned securely to place in the opposite ear "C." The screws "E E" in the straps "B B" are then turned gently to a point of contact against the edge of the lens "H," which forces the said lens away, so that the outer wall of the hole "J" in the lens "H" is firmly in contact with the screw "G," thus causing a continuous pressure against said screw, the lens and screws "G" and "E E" are then ridged and cannot work loose. The straps "B B" are made sufficiently heavy so they cannot be bent by any strain on the lens. The straps on mountings now in use are thin and made of soft metal, and are constantly giving trouble by being bent away from the lens and allowing both the lens and screws to become loose.

Referring to Fig. 1, it will be seen that the straps "B B" indicate a substantial thickness so they cannot be bent by any pressure from the lens "H," and it is not necessary for the straps "B B" to be as long as the ordinary straps now in use on frameless mountings.

The screws "E E" may be set at any desired place on the straps "B B." Said mountings may be made so as to hold the lens tight by using my device in only one strap.

Having thus described my invention, what I claim as new, and desire to secure by Letters Patent is:

1. A clip fastener for eye glasses having apertured ears, a screw carried thereby and engaging a lens, lens straps upon the shank portion of said fastener, and a set screw carried by one of said straps and adapted to bear against the edge of the lens, as set forth.

2. An eye glass mounting having a lens strap provided with an adjustable screw adapted to bear against the edge of the lens.

3. An eye glass mounting having oppositely extending lens straps, each provided with an adjustable screw adapted to bear against the edge of the lens.

4. An eye glass mounting having a lens strap provided with a reversible adjustable screw adapted to bear against the edge of the lens.

5. An eye glass mounting including a lens strap, ears projecting from the frame, a lens mounted between said ears, a member extending through said ears and said lens, and a screw adjustably extending through said strap and bearing against the edge of the lens to hold the same rigid.

6. An eyeglass mounting having a lens strap provided with an adjustable member adapted to bear against the edge of the lens.

JAMES HOYT BROWN.

Witnesses:
WM. LEE JUKES,
I. C. ADAMS.

Copies of this patent may be obtained for five cents each, by addressing the "Commissioner of Patents, Washington, D. C."